United States Patent
Reinhardt et al.

(10) Patent No.: US 10,900,898 B2
(45) Date of Patent: Jan. 26, 2021

(54) LUMINESCENT SECURITY FEATURE AND METHOD AND DEVICE FOR EXAMINING IT

(71) Applicant: CSEM Centre Suisse d'Electronique et de Microtechnique SA—Recherche et Développement, Neuchatel (CH)

(72) Inventors: Jonas Reinhardt, Igis (CH); Christoph Hofer, Bassersdorf (CH); Stefano Cattaneo, Landquart (CH)

(73) Assignee: CSEM Centre Suisse d'Electronique et de Microtechnique SA— Recherche et Développement, Neuchatel (CH)

( * ) Notice: Subject to any disclaimer, the term of this patent is extended or adjusted under 35 U.S.C. 154(b) by 0 days.

(21) Appl. No.: 16/337,661

(22) PCT Filed: Sep. 12, 2017

(86) PCT No.: PCT/EP2017/072890
§ 371 (c)(1),
(2) Date: Mar. 28, 2019

(87) PCT Pub. No.: WO2018/059933
PCT Pub. Date: Apr. 5, 2018

(65) Prior Publication Data
US 2019/0226990 A1 Jul. 25, 2019

(30) Foreign Application Priority Data
Sep. 30, 2016 (EP) .................................... 16191814

(51) Int. Cl.
*G01N 21/64* (2006.01)
*B42D 25/378* (2014.01)
(Continued)

(52) U.S. Cl.
CPC ....... *G01N 21/6408* (2013.01); *B42D 25/378* (2014.10); *G07D 7/1205* (2017.05)

(58) Field of Classification Search
CPC . B42D 25/378; G01N 21/6408; G07D 7/1205
See application file for complete search history.

(56) References Cited

U.S. PATENT DOCUMENTS 3,650,400 A * 3/1972 Warren ................. B07C 5/3412
250/365
5,485,530 A   1/1996 Lakowicz et al.
(Continued)

FOREIGN PATENT DOCUMENTS

DE    19808652 A1    9/1999
WO     9509499 A1    4/1995
(Continued)

OTHER PUBLICATIONS

Esposito et al., "All-Solid-State Lock-In Imaging for Wide-Field Fluorescence Lifetime Sensing," Optics Express, 2005, pp. 9812-9821, vol. 13:24.

*Primary Examiner* — Mark R Gaworecki
(74) *Attorney, Agent, or Firm* — The Webb Law Firm (57) ABSTRACT

A security feature has a plurality of luminescent surface elements, wherein luminescence lifetime varies between the surface elements. In order to verify the security feature, a lock-in imager is used. The security feature is illuminated with excitation light, which is intensity-modulated with a modulation frequency. The luminescent light emitted by the security feature is detected synchronously with the modulation frequency in a plurality of pixels. This is used to determine a measure of a phase shift between the excitation light and the luminescent light in different pixels. The security feature is verified taking account of the measure of the phase shift in different pixels.

15 Claims, 6 Drawing Sheets

(51) Int. Cl.
*G07D 7/12* (2016.01)
*G07D 7/1205* (2016.01)

(56) References Cited

U.S. PATENT DOCUMENTS

| | | | |
|---|---|---|---|
| 5,608,225 A | | 3/1997 | Kamimura et al. |
| 2003/0129770 A1 | * | 7/2003 | Fernandez ......... G01N 21/6428 |
| | | | 436/518 |
| 2005/0178841 A1 | * | 8/2005 | Jones, II .............. G07D 7/1205 |
| | | | 235/468 |
| 2007/0018116 A1 | | 1/2007 | Lustenberger et al. |
| 2007/0145293 A1 | | 6/2007 | Roth |
| 2008/0048106 A1 | * | 2/2008 | Blanchard ............. G07D 7/121 |
| | | | 250/252.1 |
| 2008/0116272 A1 | | 5/2008 | Giering et al. |
| 2012/0187341 A1 | * | 7/2012 | Strek ................... B42D 25/415 |
| | | | 252/301.36 |
| 2015/0260653 A1 | | 9/2015 | Lazzouni et al. |
| 2015/0314630 A1 | * | 11/2015 | Pflughoefft .......... B42D 25/382 |
| | | | 250/459.1 |
| 2016/0003741 A1 | * | 1/2016 | Diebold ............. G01N 21/6408 |
| | | | 250/459.1 |

FOREIGN PATENT DOCUMENTS

| | | | |
|---|---|---|---|
| WO | 0127883 | A1 | 4/2001 |
| WO | 2013179249 | A1 | 12/2013 |

\* cited by examiner

LUMINESCENT SECURITY FEATURE AND METHOD AND DEVICE FOR EXAMINING IT

CROSS-REFERENCE TO RELATED APPLICATIONS

This application is the United States national phase of International Application No. PCT/EP2017/072890 filed Sep. 12, 2017, and claims priority to European Patent Application No. 16 191 814.9 filed Sep. 30, 2016, the disclosures of which a hereby incorporated by reference in their entirety.

BACKGROUND OF THE DISCLOSURE

Field of the Disclosure

The present invention relates to a luminescent security feature, to a method for verification of such a security feature, and to a device for executing such a verification method.

Description of Related Art

The problem of counterfeiting of original products is increasing continuously in greatly varying economic and technical fields. New technologies permit the mass copying of the originals in such a quality that copies can be differentiated hardly or not at all by the naked eye from the original. Not only luxury articles are affected, but rather also components of technical devices, for example in the field of automobile construction, medical technology, or the electronics industry, sometimes also with safety-relevant properties.

To protect themselves against this type of product piracy, many producers provide their products with security features (also referred to as identification features or ID features). Security features are used to check the authenticity of a product or to track its path from the production location to the end customer. Such security features can be produced, for example, on the basis of a color, a fluorescence, or other physical properties. A variety of types of security features is known from the prior art, from simple stickers via holograms, which are formed on a sticker or on the product itself, up to special ingredients which are embedded in the material of the product.

Complex security features can enable a producer to identify the production lot or even a single or individual product. They can also contain metadata such as production date and production location, expiration dates, and similar data in coded form. There is thus a demand for increasingly complex security features.

Simple terminology has become established for the degree of complexity of a security feature. One refers to level 1 features (first level feature, first level security feature), if an analysis of the feature for the purpose of authentication and/or identification is possible with the aid of the natural senses, i.e., an auxiliary device is not required. For example, a security thread represents a first level feature. A second level feature (level 2 feature, second level security feature), requires a simple auxiliary device such as a loupe or a UV lamp for the analysis. A third level feature (level 3 feature, third level security feature) requires a forensic analysis using extensive equipment and/or professional operating personnel for its analysis.

First level features are generally well suited as a type of preliminary check for the consumer, but usually do not permit an identification of an individual product from a larger series. Moreover, a first level feature represents an obvious challenge to a counterfeiter to simulate the feature. Intelligent second level features, in contrast, open up the possibility of a good compromise with respect to an authentication down to the series level or individual item level with acceptable costs and simple handling.

In particular security features on the basis of fluorescent dyes are known from the prior art.

Thus, U.S. Pat. No. 5,608,225 discloses a method for detecting a fluorescent marking, in which the marking is illuminated using excitation light, the intensity of which changes periodically. Correspondingly, the intensity of the fluorescent light emitted by the marking also changes periodically, wherein the phase of the fluorescence intensity is shifted in relation to the phase of the excitation intensity. To establish whether a marking is a fluorescent marking, it is proposed that it be checked whether the marking emits light phase-shifted in this manner upon illumination using intensity-modulated excitation light. Moreover, it is proposed that the absolute value of the phase shift be measured to determine the type of the fluorescent material of which the marking consists.

WO 95/09499 A1 discloses a method for the authentication of objects, in which a fluorescent marking is also illuminated using periodically intensity-modulated excitation light. To characterize the fluorescent light reflected from the object, various properties of the fluorescent light are determined, among them, inter alia, the time shift between excitation light and fluorescent light.

US 2015/0260653 A1 proposes a security feature which comprises a mixture of luminescent materials having different lifetimes. The materials used can be inferred by an analysis of the decay spectra after an excitation. The measurement of the decay spectra is performed in the time domain by the security feature being excited by illumination using excitation light, the illumination then being ended, and subsequently the time curve of the intensity of the fluorescent light being recorded.

From a completely different technical field, namely the field of life sciences, a method is known which is referred to as fluorescence lifetime imaging microscopy (abbreviated FLIM). Fluorescence lifetime imaging microscopy is an imaging method which uses fluorescent markers, which have varying fluorescence lifetimes in different physicochemical environments. The fluorescent markers are thus more or less used as local chemical probes. A spatially-resolved measurement of the fluorescence lifetime over the surface of a sample is performed for the imaging. Inferences can be drawn therefrom about the spatial variation of the physicochemical environment of the fluorescent markers used. In this manner, FLIM enables the determination of the spatial distribution of variables such as pH value, ion concentration, oxygen content, etc. in living cells, tissue, and model organisms. Furthermore, FLIM enables the spatial mapping of protein-protein interactions in cells by determining the spatial distribution of the Frster resonance energy transfer (FRET). For example, the monograph *FLIM Microscopy in Biology and Medicine*, Periasamy A., Clegg R. M., ISBN-10: 1420078909, ISBN-13: 978-1420078909, CRC Press, 2010 offers an overview of technology and classical applications.

US 2007/0018116 A1 discloses a device for imaging a luminescent sample, which is suitable in particular for fluorescence lifetime imaging microscopy. The device has a light source to illuminate the sample using excitation light. A light modulator periodically modulates the intensity of the excitation light. A spatially-resolving lock-in imager having a plurality of pixels detects the luminescent light which is emitted by the sample and determines a dimension of the phase shift between the modulation of the excitation light and the luminescent light pixel by pixel. The spatial distribution of the fluorescence lifetime can then be derived therefrom.

SUMMARY OF THE DISCLOSURE

In a first aspect, it is an object of the present invention to provide a security feature on the basis of luminescent dyes which is suitable to be designed as a second level feature, wherein the security feature in particular permits coding of items of information which can be used, for example, for identification on the series level or individual item level, without these items of coded information being readable using the naked eye.

A security feature is thus provided which has multiple luminescent surface elements, wherein a luminescence lifetime is determinable for each of these surface elements, and wherein the luminescence lifetime varies between the surface elements. In other words, the luminescence lifetime is not identical in all surface elements, but differs in at least one surface element from the luminescence lifetime in an adjacent surface element.

In luminescence, a physical system is put into an excited state by energy absorption and emits light. The phenomenon of luminescence typically includes fluorescence and phosphorescence. The term "light" is understood as electromagnetic radiation in the infrared range, visible range, and UV range, in particular in the wavelength range from 100 nanometer to 10 micrometer.

The time profile of the intensity $I(t)$ of the luminescence of a sample having a single luminescent dye after ending an excitation may frequently be described in good approximation by the equation $$I(t)=I_0 \exp(-t/\tau) \quad \text{(equation 1)},$$

wherein $I_0$ is the initial intensity and $T$ is the luminescence lifetime.

In particular in the case of fluorescence, the fluorescence lifetime is frequently not determinable using the naked eye, since fluorescence lifetimes are frequently in the range of picoseconds to microseconds and are therefore below the timescale which is differentiable using the naked eye. However, an image of the spatial distribution of the fluorescence lifetime may be produced with technical aids, as will be explained in greater detail hereafter. The security feature according to the invention is thus outstandingly suitable as a second level feature.

Two luminescence lifetimes are in particular to be considered to be different if they differ by more than 5%, preferably by more than 10%. Expressed mathematically, two luminescence lifetimes T1 and T2, wherein $\tau_2 > \tau_1$, are to be considered to be different in any case if the following applies: $(\tau_2 - \tau_1)/\tau_1 > 5\%$, preferably $>10\%$. In practice, of course, the differences between the luminescence lifetimes can also be substantially greater, for example more than 20%.

The different luminescence lifetimes of the surface elements can be used for coding items of information. For example, the luminescence lifetime in each surface element can assume one of two different values. This enables binary coding of data by means of the luminescence lifetime, wherein the first value of the luminescence lifetime corresponds to a logical 1 and the second value corresponds to a logical 0. Of course, however, more complex coding schemes are also possible.

Surface elements having different luminescence lifetimes can be produced in particular in that luminescent dyes having different luminescence lifetimes are applied to different surface elements. Surface elements having different luminescence lifetimes can be produced in particular in that a mixture made of two or more luminescent dyes is applied to each of the surface elements, wherein the mixture ratio varies between the surface elements. The time profile of the intensity $I(t)$ of the luminescence of a sample having a mixture of multiple luminescent dyes corresponds to a superposition of multiple exponential decays according to equation (1). If the individual luminescence lifetimes do not differ excessively strongly, such a multi-exponential decay may be described in good approximation by a single exponential decay, wherein the decay time of the mono-exponential decay curve thus approximated represents a mean value of the individual luminescence lifetimes. Therefore, a single value of the (mean) luminescence lifetime results for a surface element having a mixture of multiple luminescent dyes. This value may be readily determined in particular using the verification method discussed hereafter.

A security feature according to the invention can also contain at least two surface elements, however, which have a color application using an identical luminescent dye, wherein, however, the chemical environment of the luminescent dye differs between the surface elements in such a way that different luminescence lifetimes result in the surface elements. This can be achieved, for example, in that the same luminescent dye was applied in the different surface elements in different formulations, wherein the formulations differ, for example due to the pH value thereof, or by the two surface elements having two different functional layers, wherein the same luminescent dye is applied in the same formulation to the different functional layers, and wherein the functional layers influence the luminescence lifetime of the dye differently. One advantage of this method is that the chemical environment generally only slightly influences the excitation frequency and the emission frequency of the luminescent dye, in particular its perceptible color tone. Two surface elements having different luminescence lifetimes can therefore readily appear identical to the naked eye. This makes such a security feature particularly attractive as a second level feature.

The expression that a specific parameter (such as the luminescence lifetime) "varies between the surface elements" is always to be understood hereafter to mean that the relevant parameter is not identical in all surface elements, but that there are at least two adjacent surface elements in which the relevant parameter assumes different values.

The surface elements can also differ by way of further parameters of the luminescence. Thus, for each surface element, for example additionally an excitation frequency (equivalent: absorption wavelength) and an emission frequency (equivalent: luminescence wavelength, "color tone" of the luminescent light) can be determinable. For example, each surface element can bear precisely one fluorescent dye, which has a characteristic excitation frequency and a characteristic emission frequency. It is then advantageous if additionally not only the luminescence lifetime, but also the excitation and/or emission frequency varies between the surface elements. This can be achieved in particular in that different fluorescent dyes are applied to various surface elements. An additional dimension is thus provided, by which data can be coded. A first dimension is given by the luminescence lifetime, by the variation of the luminescence lifetime between the surface elements being analyzed. A second dimension is given by the excitation frequency or the emission frequency, by the variation of the relevant frequency between the surface elements being analyzed. It is preferable in this case if the variation of the excitation and/or emission frequency does not correlate completely with the variation of the luminescence lifetime, so that the excitation and/or emission frequency can code data independently of the luminescence lifetime.

Two excitation or emission frequencies are considered to be different in particular if they differ by more than 5%, preferably by more than 10% or even more than 20%, wherein the excitation or emission frequency is considered to be the position of the maximum in the spectral distribution of the absorbed or emitted light, respectively. In the visible wavelength range (approximately 400-750 nm), two excitation or emission frequencies are thus considered to be different if the relevant wavelengths differ by more than 5%, i.e., depending on the wavelength by more than 20-38 nm. Such differences in the position of the absorption or emission maxima may readily be spectroscopically resolved, although the width of the excitation spectrum and of the emission spectrum of typical luminescent dyes is frequently substantially greater than this difference. Greater differences can also be perceived visually as color differences under certain circumstances.

A further dimension can be generated in that the color intensity (in particular the concentration of the luminescent dye in the respective surface element) also differs between the surface elements. It is also preferable in this case if the variation of the color intensity does not correlate completely with the variation of the luminescence lifetime, so that the color intensity can code data independently of the luminescence lifetime.

In a second aspect, the present invention provides a verification method, which is suitable in particular for verifying a security feature of the above-mentioned type. The method comprises:
    illuminating the security feature using excitation light which is intensity-modulated at a modulation frequency;
    detecting luminescent light, which is emitted by the security feature, in a plurality of pixels;
    determining a dimension for the phase shift between the excitation light and the luminescent light at the modulation frequency in different pixels; and
    verifying the security feature in consideration of the dimension for the phase shift in different pixels.

To determine the spatial distribution of the luminescence lifetime, the invention proposes transferring technical principles, which were developed in a completely different technical context, namely for fluorescence lifetime imaging microscopy (FLIM), to the entirely different stated problem of verifying security features.

The detection of the luminescent light can be performed in particular using a lock-in imager. A lock-in imager is disclosed, for example, in the document US 2007/0018116 A1. The content of the cited document is completely incorporated into the present description by reference. Various configurations and operating modes for lock-in imagers are known. The lock-in imager known from US 2007/0018116 A1 is distinguished in particular by the following properties: it has a detector which defines a plurality of pixels, wherein the pixels are arranged in particular in a two-dimensional array, and also a control unit, to establish a phase relationship between the intensity-modulated light source and the detector. At least a part of the pixels of the imager chip, preferably every pixel, comprises the following:
    a light-sensitive element to convert incident light into an electrical signal;
    at least one storage element, preferably at least two storage elements, in particular precisely two or four storage elements, to store the electrical signal;
    a transfer unit, to transfer the electrical signal to a selected storage element; and
    a read unit, to read the electrical signal selectively out of the storage element or the storage elements of the pixel.

In this case, the transfer unit interacts with the control unit in such a way that the transfer unit transfers the electrical signal synchronously and in phase with the modulation frequency to the storage element or the storage elements.

In this manner, a dimension may be determined for the phase shift between the excitation light and the light received by the detector.

The transfer means can comprise in particular at least two CCD gate electrodes, wherein each of the gate electrodes comprises a terminal for an electrical potential or another means for generating a lateral electrical drift field on a surface of the detector. The storage elements can be integration gates. For further details, reference is made to the document US 2007/0018116 A1.

In general form, the present invention thus also relates to the use of a lock-in imager for verification of a security feature of the above-mentioned type.

For the purposes of the verification of the security feature, the dimension for the phase shift in different pixels is preferably visualized in real time. A video film is thus more or less produced, which represents a spatial distribution of the phase shift as a function of time.

In addition, still further parameters can be determined, which are characteristic of the luminescence. The method can thus comprise in particular:
    determining a dimension for at least one of the following parameters in different pixels: excitation frequency, emission frequency, and luminescence intensity, and
    verifying the security feature both in consideration of the dimension for the phase shift in different pixels and also in consideration of the dimension for the at least one mentioned parameter in different pixels.

In this case, both the dimension for the phase shift in different pixels and also the dimension for the mentioned parameter in different pixels are preferably visualized for the purposes of verification of the security feature, preferably in real time.

In a further aspect, the present invention provides a detection unit for the verification of a security feature, in particular a security feature of the above-mentioned type, which comprises:
    a light source for generating excitation light, wherein the light source is designed to modulate the intensity of the excitation light at a modulation frequency; and
    a lock-in imager, which comprises a plurality of pixels, to detect luminescent light, which is emitted by the security feature, synchronously with the modulation frequency and to determine a dimension for a phase shift between the excitation light and the luminescent light in different pixels; and
    an interface, which is configured to transmit the dimension for the phase shift in different pixels to a display and analysis unit.

In this manner, the display and analysis unit is made capable of verifying the security feature in consideration of the dimension for the phase shift in different pixels.

Reference is made to the above statements for the design of the lock-in imager.

The detection unit preferably has a housing, in which the light source and the lock-in imager are arranged. The housing then has a window which is designed to be arranged above the security element. The detection unit has imaging opticsin this case to image and focus the security element arranged below the window on the lock-in imager. The imaging ooptics can be in particular reducing optics, which images an object in the focal plane of the optics in reduced scale on the lock-in imager. In contrast to fluorescence lifetime imaging microscopy (FLIM), in this case the object to be imaged is reduced in size, not enlarged. The focusing is preferably performed on a region which is located directly below the window in the housing, in particular less than 30 cm, preferably less than 10 cm, particularly preferably less than 1 cm away from the plane of the window in the housing.

The detection unit is preferably designed as portable to enable mobile verification of security features.

The lock-in imager can be designed, in addition to the dimension for the phase shift in different pixels, to also determine a dimension for at least one of the following parameters: excitation frequency, emission frequency, and luminescence intensity. The interface is then configured, in addition to the dimension for the phase shift in different pixels, to also transmit the dimension for the mentioned parameter in different pixels to the display and analysis unit.

The invention furthermore provides a verification device having a detection unit of the above-mentioned type and having a display and analysis unit. In this case, the display and analysis unit is integrated with the detection unit to form a single device or is formed separately from the detection unit. Examples will be discussed in greater detail hereafter. The detection unit is configured in such a way that it transmits the dimension for the phase shift in different pixels determined by the lock-in imager to the display and analysis unit. The display and analysis unit can then be configured in such a way that it generates a graphic representation from the dimension for the phase shift in different pixels. Alternatively or additionally, the display and analysis unit can be configured in such a way that it executes an automated verification on the basis of the dimension for the phase shift and outputs the verification result and/or relays it to a server.

The display and analysis unit can be in particular a smartphone or a tablet computer which executes a suitable app.

BRIEF DESCRIPTION OF THE DRAWINGS

Preferred embodiments of the invention will be described hereafter on the basis of the drawings, which serve only for explanation and are not to be interpreted as restrictive. In the drawings:

FIGS. 8(*a*)-8(*b*) show a diagram which visualizes the distribution of a fluorescent feature substance on the basis of the detected fluorescence decay times for two different security elements;

FIGS. 9(*a*)-9(*b*) show a diagram which visualizes the read-out raw data of an image sensor for two different phase positions, recorded from a security feature having three surface elements of different fluorescence lifetimes; FIG. 9(*a*): image at relative phase 0°; FIG. 9(*b*): image at relative phase 90°; and FIGS. 10(*a*)-10(*b*) show a diagram, which visualizes the data derived therefrom on the phase difference and the fluorescence lifetime; FIG. 10(*a*): phase difference; FIG. 10(*b*): fluorescence lifetime in nanoseconds.

DESCRIPTION OF PREFERRED EMBODIMENTS

Figure 1:
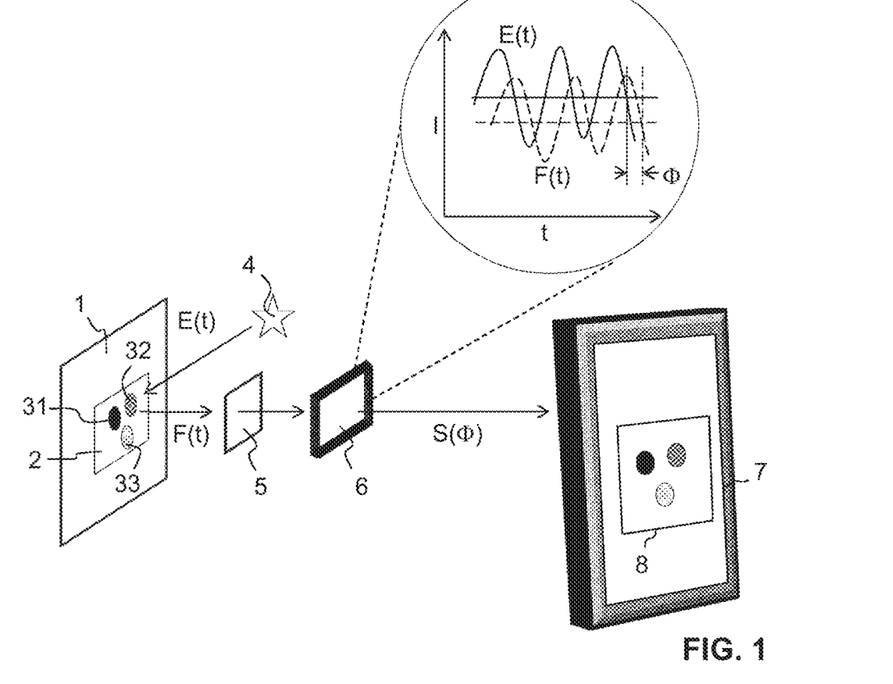
FIG. 1 shows a schematic sketch to visualize a security feature having three surface elements of different fluorescence lifetimes.

FIG. 1 illustrates the basic principle of a method for verification of a security feature according to the present invention.

An object 1 is provided with a security feature 2, which, in the present example, comprises three surface elements 31, 32, 33 made of fluorescent feature substance s having different fluorescence lifetimes. The security feature 2 is illuminated by a light source 4 using excitation light E(t). The intensity I of the excitation light E(t) is modulated at a modulation frequency of, for example, 20 MHz. The excitation light E(t) is optionally spectrally selected using an excitation filter (not shown).

The fluorescent feature substances are excited by the excitation light and emit fluorescent light F(t), the intensity I of which is modulated at the same modulation frequency, but is phase-shifted. In this case, the phase shift $\Phi$ is dependent on the fluorescence lifetime of the respective feature substance. Thus, for a simple sinusoidal modulation, for example, tan $\Phi=\omega\tau$ applies, wherein $\omega$ denotes the angular frequency of the modulation and $\tau$ denotes the fluorescence lifetime in the meaning of the above-mentioned equation (1). The emitted light F(t) is conducted through a blocking filter 5, which is transparent to the frequency of the fluorescent light, for example 535 THz (560 nm). In the case of down-converting or a Stokes emission, the blocking filter can be a long-pass filter, while the blocking filter can be a short-pass filter in the case of up-converting or an anti-Stokes emission. However, the blocking filter can also be a bandpass filter or narrowband filter.

Subsequently, the light thus filtered reaches a lock-in imager 6. The lock-in imager 6 determines a dimension for each of an array of pixels, for example 256×256 pixels, for the phase shift $\Phi$ between excitation light and fluorescent light for each pixel and generates corresponding signals $S(\Phi)$.

The lock-in imager can be constructed in a fundamentally similar manner in this case as is specified in the document US 2007/0018116 A1. Reference is made to the cited document for details of the functionality of such a lock-in imager. In contrast to the cited document, the lock-in imager in the present context is used not for the fluorescence lifetime imaging microscopy of biological samples, but rather for capturing a security feature. The present apparatus accordingly differs from the apparatus of the cited document in particular by way of different optical beam guiding and a different output interface, as will be described in greater detail hereafter. Depending on the embodiment, the lock-in imager can also enable a different resolution than the abovementioned one, for example in the format 16:10 between CGA (320×200 pixels) to WUXGA (1920×1200 pixels), wherein other formats or other or deeper or higher resolutions are also possible, for example HD720 with 1280×720 pixels in the format 16:9. The frame rates are, depending on the embodiment, between 24 and 240 fps (frames per second), preferably between 60 and 150 fps.

The signals $S(\Phi)$ are processed by a downstream electronics unit and provided at an interface, so that they can be visually displayed by a display and analysis unit 7, for example a smartphone, as an image 8. The distribution of the fluorescence lifetimes of the feature substances within the capture area of the lock-in imager 6 is reproduced in this case in the scope of the resolution of the imager on the display and analysis unit 7 as a pixel graphic.

Figure 2:
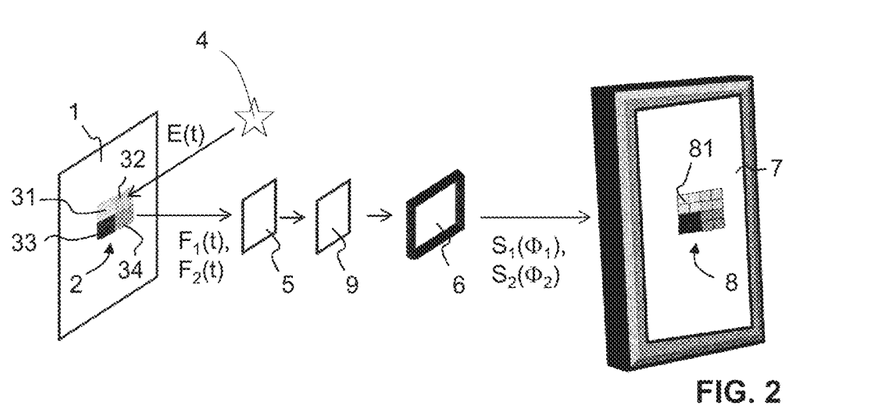
FIG. 2 shows a schematic sketch to visualize a security feature having four surface elements made of fluorescent feature substances having differing frequency of the fluorescent light and differing fluorescence lifetime.

The individual surface regions can differ not only by way of the luminescence lifetime thereof, but rather also by way of the emission frequency thereof. This is illustrated by way of example in FIG. 2. In the embodiment of FIG. 2, the security feature 2 comprises four surface elements 31-34, wherein each surface element is characterized, on the one hand, by its fluorescence lifetime and, on the other hand, by its fluorescence wavelength. A unique combination of fluorescence lifetime and fluorescence wavelength can thus be associated with each surface element. For example, the fluorescence lifetime of each surface element can assume one of two different values (so that the fluorescence lifetime thus codes a binary bit 1 or 0), and each fluorescence wavelength can also assume one of two values independently thereof (thus codes a further bit 1 or 0). Overall, the illustrated security feature made of four surface elements thus enables a coding of $2^4 \times 2^4 = 256$ bits. The number of the bits thus coded can be readily increased further by a higher number of surface elements and/or a higher number of values to be selected for the fluorescence lifetime and/or fluorescence wavelength. An individualization down to the individual item level can thus be readily achieved.

To not only determine the fluorescence lifetime in a spatially-resolved manner, but also to resolve the fluorescence wavelength, a narrowband filter 9 (i.e., a highly selective color filter) is provided in the example of FIG. 2, which supplements or optionally replaces the blocking filter 5. For the measurement of various fluorescence wavelengths, the filter is replaced in each case by a highly selective color filter which is transmissive at the desired wavelength. The filters 5 and/or 9 can be located directly on the lock-in imager. Alternatively, it is also possible to combine multiple pixels, for example 2×2 adjacent pixels, to form a group and to provide different color filters on the pixels of each group, to achieve a wavelength selectivity in a similar manner as is implemented in conventional photosensitive chips for photography by the known Beyer filter. Alternatively, it is possible to use a monochromator, for example on the basis of an optical prism or grating, to achieve a wavelength selectivity. In this case, the transmission wavelength of the monochromator can be changeable by electrical control signals, to carry out a spatially-resolved imaging of the fluorescence lifetime at different fluorescence wavelengths sequentially.

In this manner, an image 8 can be generated in the display and analysis unit 7, which visualizes both the distribution of the fluorescence lifetime (symbolized in FIG. 2 by the signals $S_1(\Phi)$, $S_2(\Phi)$) and also the distribution of the fluorescence wavelength (symbolized in FIG. 2 by the signals $F_1(t)$, $F_2(t)$).

In the present example, each surface element is represented by four pixels 81 in this image 8. Each pixel is characterized in the present example by one of four value pairs $(F_1, \Phi_1)$, $(F_1, \Phi_2)$, $(F_2, \Phi_1)$, and $(F_2, \Phi_2)$. A different color can be assigned to each value pair, for example, for the visualization of these value pairs. Alternatively, the fluorescence wavelength can be visualized by different colors, while the fluorescence lifetime is visualized by different saturation values of these colors. It is also possible to display two separate images for the parameters fluorescence wavelength and fluorescence lifetime. Of course, there is a large number of further options for performing a visualization.

If the concentration of the feature substances additionally also varies between the surface elements, this may be represented, for example, additionally by different color intensities. Overall, an image having characteristic coloration and form thus results, which enables simple visual recognition of the feature substances on the display of the playback device and thus simple visual verification of the security feature and/or the object marked thereby.

Alternatively or additionally, the verification can also be performed in an automated manner by an app on the playback device and displayed to the observer as a genuine/counterfeit specification. The verification result can optionally be transmitted to a remote server, or the image data can be transmitted to a server, to perform the verification there and to transmit the result back to the playback device again.

Figure 3:
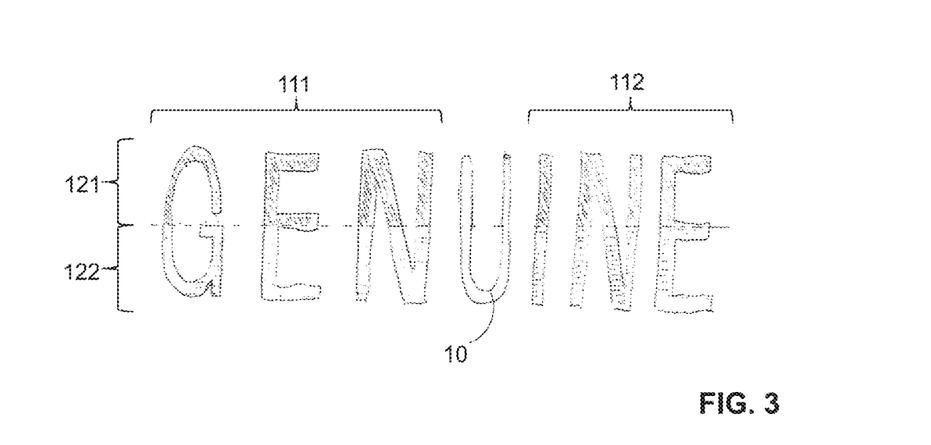
FIG. 3 shows an illustration of an inscription which is partially formed from fluorescent feature substances, wherein they are distinguished by different concentrations in specific regions of the inscription and different fluorescence lifetimes.

FIG. 3 shows an example of a security feature in the form of a graphic, which represents the inscription "GENUINE". In this case, the regions 111, 112, 121, 122 of the inscription are formed from different fluorescent feature substances in different concentrations, and the middle letter "U" is formed from a non-fluorescent printing ink. The fluorescence lifetime is constant in each of the regions 111, 112, but differs between these regions. At the same time, the concentration of the feature substances (and thus the perceived color intensity) is constant in each of the regions 121, 122, but differs between these regions. The first three letters of the word GENUINE thus fluoresce with a different fluorescence lifetime than the last three, while the upper half of the fluorescent letters fluoresce with a different intensity, for example significantly stronger than the lower half. The lock-in imager captures the different parameters fluorescence lifetime and fluorescence intensity. The playback device visually displays the spatial distribution of these parameters in the fluorescent light in a suitable manner. As a result of the intrinsic color of the feature substances, the entire inscription is also readable with the naked eye. However, it is not recognizable in this case that the first three letters have a different fluorescence lifetime than the last three letters. This difference only becomes recognizable by the recording using the lock-in imager.

Of course, such a graphic can also still be made more complex by the additional differentiating feature of the fluorescence frequency, wherein the display and analysis unit 7 can possibly visualize both fluorescence frequency and also lifetime.

Figure 4:
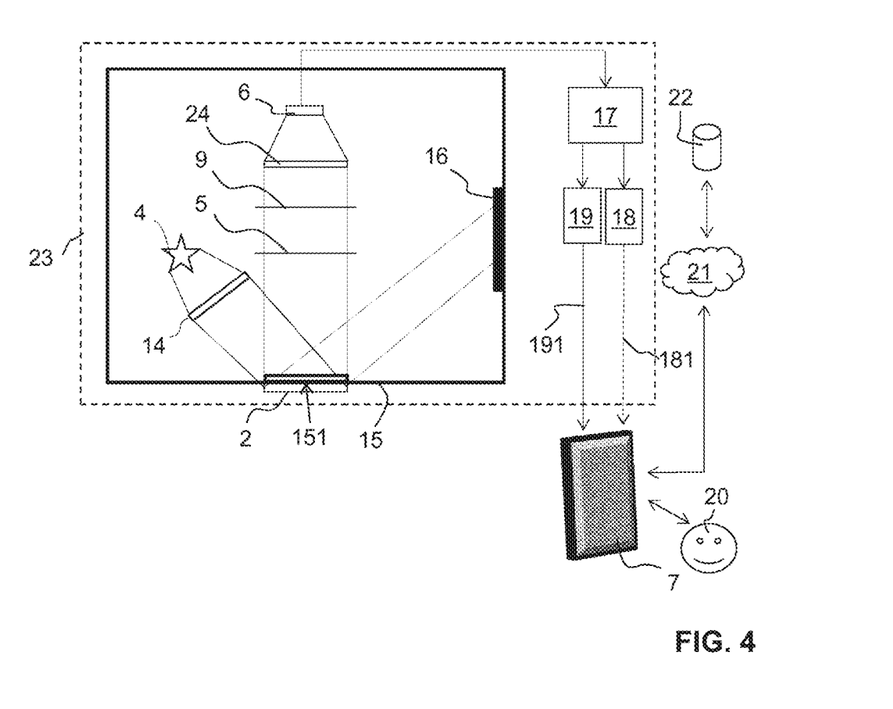
FIG. 4 shows a schematic sketch of the construction of a device having detection unit and display and analysis unit.

FIG. 4 shows, by way of example, a schematic functional illustration of a device for verification of a security feature, wherein the device carries out a two-dimensional capture of a fluorescence of feature substances of the safety feature which is phase-shifted in relation to modulated excitation light. The device comprises a detection unit 23 and a display and analysis unit 7. A part of the detection unit 23 is encapsulated light-tight in a housing 15.

The detection unit 23 comprises, in the interior of the housing 15, an intensity-modulated light source 4, for example an LED operated in an intensity-modulated manner. The light emitted by the light source reaches a window 151 in the housing 15 through optics 14 for beam guiding. The light illuminates a security feature 3 there, which was placed below the window 151. Light which is reflected directly from the security feature reaches a light trap 16, where it is absorbed. The fluorescent light emitted by the security feature 3 reaches the above-mentioned lock-in imager 6 through the above-mentioned filters 5, 9 and imaging optics 24. In this case, the wavelength filter 9 can be embodied, for example, as a replaceable insert filter or filter wheel having multiple filter regions of different transmission wavelengths, to transmit fluorescent light of different wavelength ranges selectively in succession to the lock-in imager. As mentioned above, a further option is to provide a filter layer on each pixel of the lock-in imager 6, so that a specific filter is assigned to each pixel and a simultaneous capture of multiple luminescence frequencies thus becomes possible, or to provide a monochromator.

Of course, the detection unit can also comprise further components, for example optical elements for providing a defined beam geometry and for improving the beam quality for the excitation and fluorescent light. For example, the light of the light source 4 can be widened in such a way that the window 151 of the detector unit is illuminated as uniformly as possible. On the other hand, the beam of the fluorescent light is to be narrowed to the size of the lock-in image chip, wherein geometrical distortions of the beam cross section are to be avoided as far as possible and focusing on the security element is enabled at the same time. The above-mentioned imaging optics is used for this purpose.

The signals from the charge dissipations from the diverse storage locations of the lock-in imager 6, the work cycles of which are subject to a time control, which is essentially triggered by the modulation of the excitation light, are processed in a downstream control unit 17 in such a way that they can be provided as image data to a display and analysis unit 7. The image data are output at a sufficiently high repetition rate that they can be combined to form video data and/or can be provided via a streaming unit to the display and analysis unit 7. Accordingly, one can refer to a real-time method in the capture of the luminescence data and the image reproduction thereof.

The display and analysis unit 7 can be, for example, a smartphone or a tablet computer, wherein this unit executes a suitable app to receive and display the data. In this case, the data can be transferred via a cable interface 19, for example a USB adapter, or via a wireless adapter 18, which transmits in suitable wireless standards such as Bluetooth or WLAN, either via cable 191 or wirelessly (radio link 181) to the display and analysis unit 7. The display and analysis unit 7 is operated by a person 20, and the output images are evaluated by this person.

The image and/or video data can additionally be relayed to a central server 22 via a network 21, for example the Internet or another type of electronic remote data transfer, such as GSM or LTE. Data can also be transferred from the server 22 to the display and analysis unit 7. Such data can relate, for example, to new software for the app or else supplementary data for the product protected using the security feature. The data transfer between analysis unit and server can take place online during a verification process or else at a later point in time, when analysis unit and server synchronize. However, solely off-line verification is also possible, in which all relevant data are stored in the display and analysis unit 7. The power supply is possible in any arbitrary manner via an internal or external power unit or battery part, wherein an interface cable such as a USB cable can come into consideration for charging a battery part.

Figure 5:
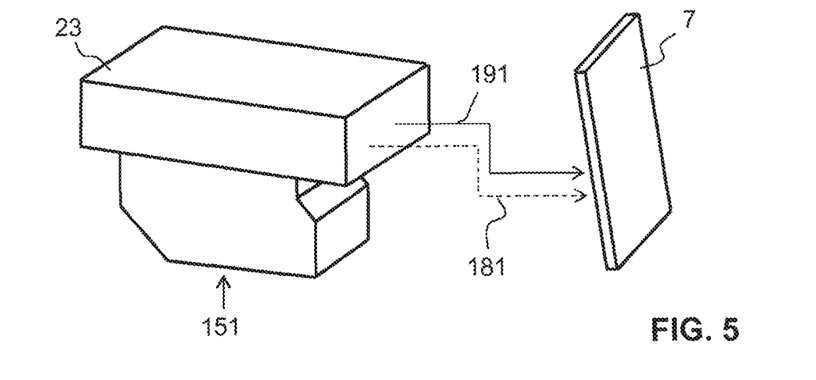
FIG. 5 shows a simplified perspective illustration of a device having detection unit and display and analysis unit according to a first embodiment.
Figure 6:
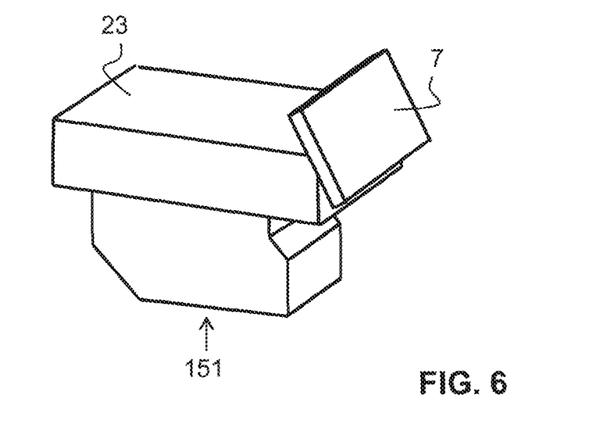
FIG. 6 shows a simplified perspective illustration of a device having detection unit and display and analysis unit according to a second embodiment, wherein the analysis and display unit is integrated in the housing of the detection unit.
Figure 7:
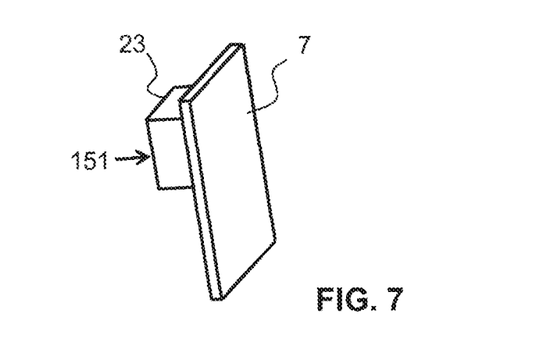
FIG. 7 shows a simplified perspective illustration of a device having detection unit and display and analysis unit according to a third embodiment, wherein the display and analysis unit is designed as a smartphone and the detection unit is designed as an attachment for the smartphone.

Various housing concepts for the verification device are illustrated by way of example in FIGS. 5-7. The detection unit 23 according to FIG. 5 has a size which enables the detection unit 23 to be moved with one hand easily above the object to be verified, while the window 151 faces toward the object having the security feature. The display and analysis unit 7, in the form of a smartphone here, is connected via cable or wirelessly to the detection unit 23 for data transfer. Of course, it is also possible, as outlined in FIG. 6, to combine detection unit 23 and display and analysis unit 7 into one handheld housing. As a consequence of a resulting miniaturization of the detection unit 23, it is ultimately possible to flange it as a module onto the display and analysis unit 7. The detection unit 23 is thus presented as in FIG. 7 like a camera attachment on a smartphone. Of course, it is also conceivable to plug the detection unit directly onto a p-USB socket (Android devices) or a Lightning socket (iPhone). As a further consequence, the integration of the detection unit into a smartphone is conceivable. The required filters are replaceable in this special embodiment like SIM cards or memory cards via slots, miniaturized drawers or compartments in the housing of the smartphone.

Figure 8A:
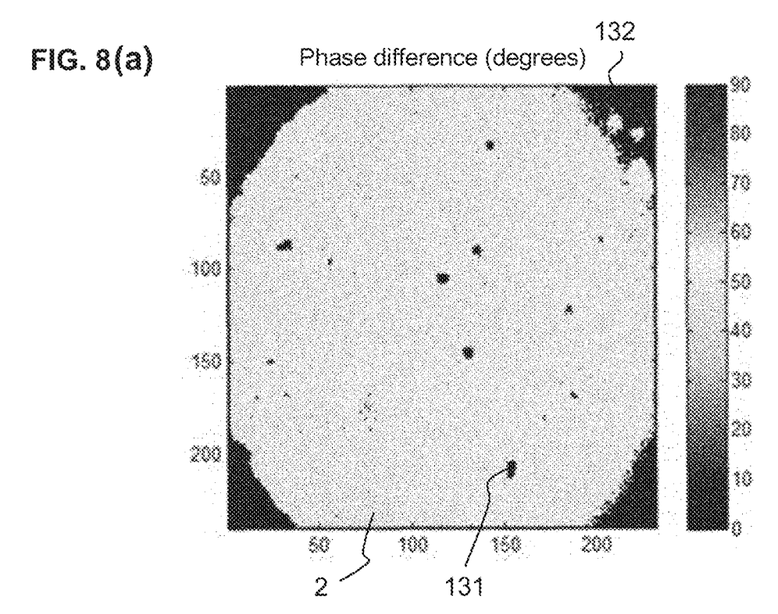
Figure 8B:
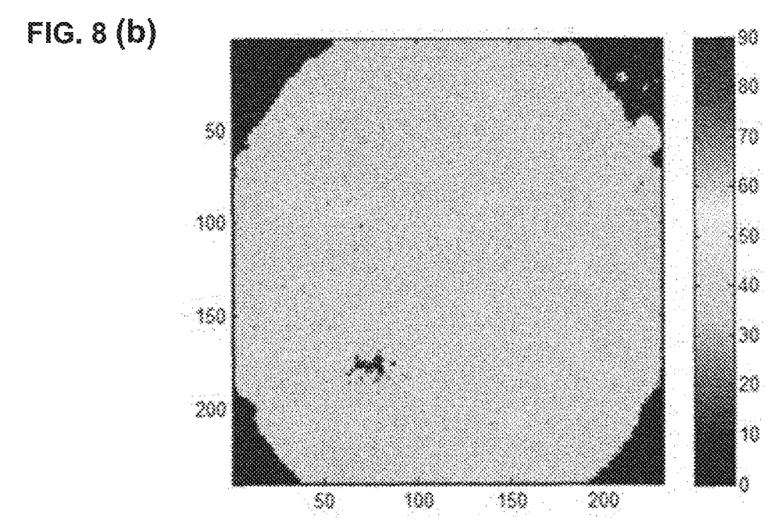

FIGS. 8(*a*)-8(*b*) present real recordings of the phase-shifted fluorescence over a security feature 2 with the aid of a lock-in imager. The fluorescent feature substance is not distributed homogeneously over the surface in these examples, and so the remaining gaps 131 are recognizable as spots. The spot pattern can be used as a fingerprint of the individual product recognition in the case of an incomplete coverage of the surface of the security feature with a fluorescent feature substance having stochastically distributed gaps. Of course, a version is also conceivable in which a graphic pattern as a recess or recesses in the surface element otherwise covered with fluorescent substance supplemented with stochastically distributed gaps can be used as a fingerprint. The pattern recognition can be performed in this application by software on the smartphone or tablet or another analysis device or alternatively can take place on a server, which analyzes the data online and returns the result to the analysis unit, or analyzes it in concealed form, i.e., does not send it back, or analyzes it offline after the next upload or the next synchronization with the device and then again optionally returns the verification result to the device.

Figure 9A:
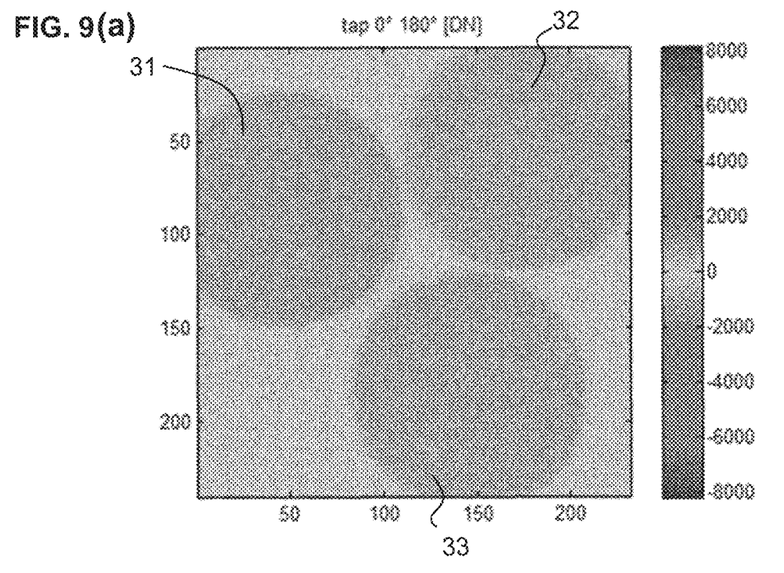
Figure 9B:
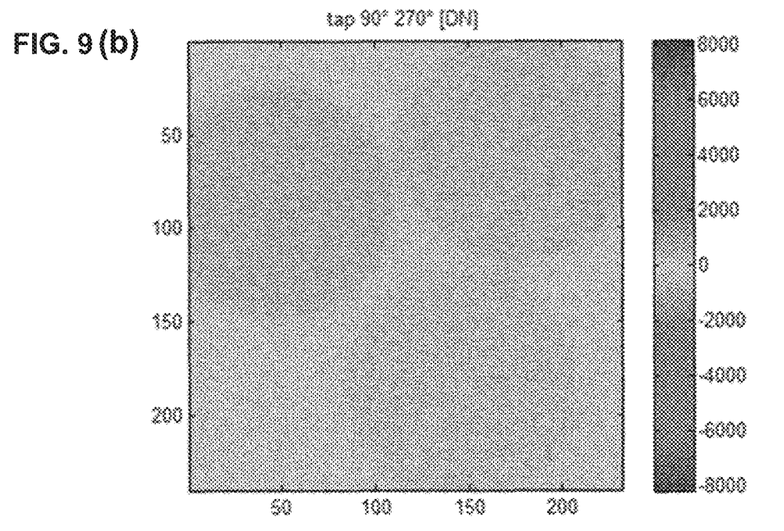

FIGS. 9(*a*)-9(*b*) and 10(*a*)-10(*b*) illustrate real images of a security feature having three circular surface elements 31, 32, 33, which have different fluorescence lifetimes. In this case, FIGS. 9(*a*)-9(*b*) show a representation of raw data from a lock-in imager, which has two storage elements per pixel, wherein the two storage elements store signals which were generated by the fluorescent light at different phase positions in relation to the modulation frequency of the excitation light. In this case, FIG. 9(a) shows the signals of the storage elements which capture the signals in a first phase position (referred to as 0° here), and FIG. 9(b) shows the signals of the storage elements which capture the signals in a second phase position, which is shifted by 90° in relation to the first phase position. Different signal levels are represented as different brightness values in this case. It can be seen from a comparison of parts (a) and (b) that the relative intensities of the raw data differ at the two phase positions 0° and 90° between the three surface elements 31, 32, 33.

Figure 10A:
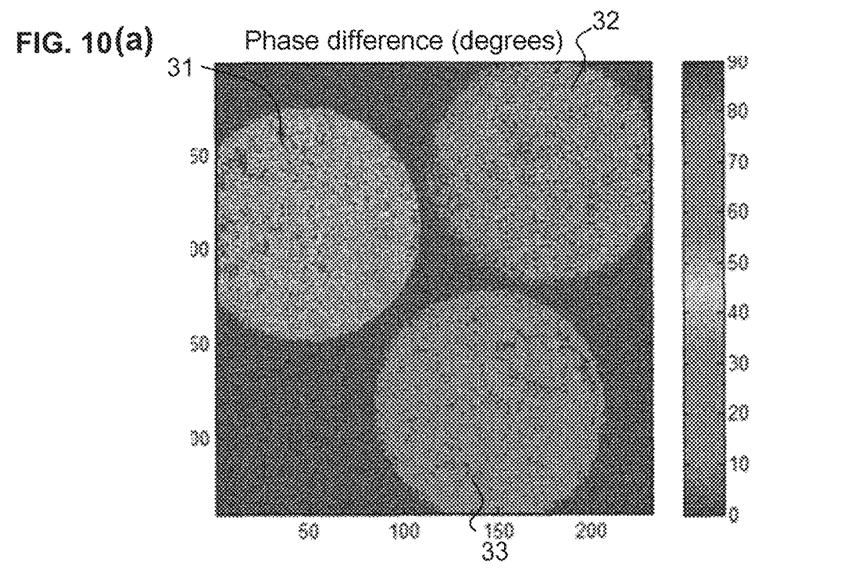
Figure 10B:
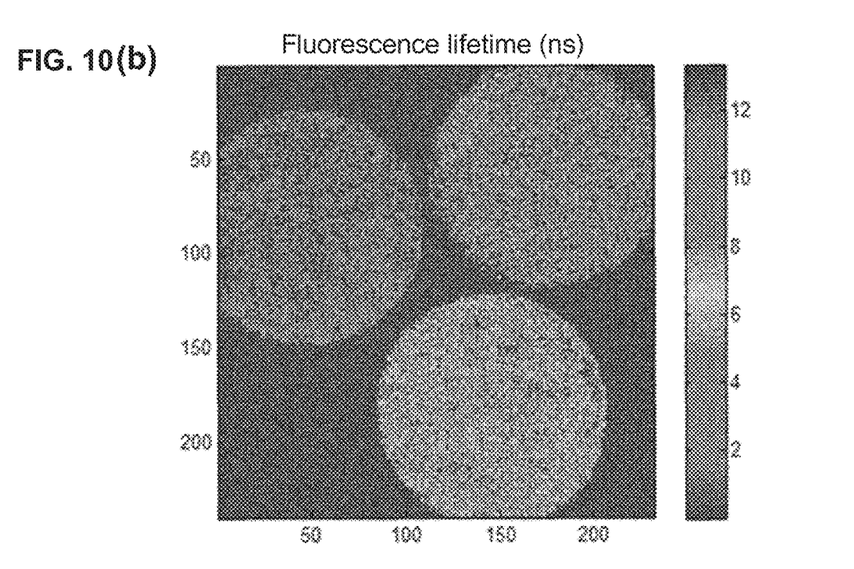

FIGS. 10(a)-10(b) show the spatial distributions derived therefrom of the phase difference between fluorescent light and excitation light (FIG. 10(a)) and of the fluorescence lifetime (FIG. 10(b)). The following fluorescence lifetimes result: 11.2 ns for surface element 31; 10.5 ns for surface element 32; and 7.2 ns for surface element 33.

This example illustrates that a practical implementation of the described principle is readily possible.

The method explained in the above embodiments is thus used to examine an object on the basis of the luminescence properties of one or more specific feature substances with respect to its authenticity, identity, or origin. In this case, in particular the lifetime of the excited state of one or more luminescent and/or fluorescent feature substances on a surface element of an object to be verified is imaged. The lifetime or decay time of the excited state is used for the characterization of a feature substance, wherein the measurements are always performed in the frequency domain. The result is a two-dimensional representation of the feature substances distributed over the surface as an image or graphic, wherein a real-time display is possible because of the high achievable frame rates. In this manner, fluorescent feature substances of differing decay time are differentiable from one another and also from nonfluorescent substances or from a nonfluorescent background.

A real-time measurement of the fluorescence lifetime or luminescence lifetime of a feature substance is thus performed.

At the same time, the device which performs the measurement permits the measurement to be performed simultaneously on all surface elements of the sample surface and visualized instantaneously. In principle, two measurement methods are available for capturing the lifetime of an excited state, on the one hand, the measurement of the reduction of the fluorescence over time (time domain or TD) or, on the other hand, via the phase shift of the emission light in relation to the excitation light in the case of a modulated light source for exciting the fluorescence (frequency domain or FD). The advantage of FD is, inter alia, that it permits a higher light intensity of the excitation source and thus a shorter image recording time. Suitable light sources having a sufficiently high spectral energy density, which can be pulsed up to an order of magnitude in the picosecond range and can be modulated in the megahertz range, are available in the form of relatively cost-effective light-emitting diodes (LEDs) or laser diodes (LDs). These components open the path to the construction of more compact and more cost-effective devices, which obtain the required data in the mode of FD and at the same time rely on the modulation capability of a light source.

The measurement of the phase shift between the modulated excitation light and the emission response enables the demand for reasonable costs and also the technical boundary conditions necessary for the application to be fulfilled. A spatially-resolving detector is used, wherein a compact construction, low costs, and a low-complexity operating electronics unit are also possible for this component. A microchannel plate (multichannel plate, MCP, also MCP-PMT) upstream of the actual detector can be used for a broad angle measurement on the part of the detector, which does have an optimum time behavior, but otherwise has disadvantages such as high price, little robustness, complex technical periphery, high noise level, and tendency toward artifacts. A compactly constructed solid-state detector similar to a conventional digital camera having comparably simple operation represents an ideal solution as an alternative.

Proceeding from so-called time-of-flight cameras, a lock-in imager (lock-in chip, lock-in sensor, lock-in CCD) was developed as a sensor for the indirect measurement of the fluorescence lifetime. The term lock-in imager or lock-in chip or lock-in sensor stands for the coupling of the modulation of the excitation light with the time control of the operating cycles of the photosensitive chip detecting the phase position. The measurement principle consists of the following elements:

A light source which can be modulated with respect to the light intensity for the excitation of the fluorescence, for example in the form of an LED or LD A photosensitive chip having the property that it is sensitive to the phase position of a preferably sinusoidally modulated light source. An appropriate chip architecture is based on the following principle, that two potential pots (locations for a charge storage, storage sites) exist per pixel (region having a photosensitive area), wherein these are under opposing gate voltage and the gate voltages are clocked by the modulation frequency of the exciting light source and are mutually phase-shifted by a phase angle of 180°. This architecture enables photons of electromagnetic waves to be collected as a function of their phase position as charges in one potential pot in each case, before the charges are dissipated via adjacent node points and generate an output signal. The chip architecture does not necessarily have to be designed in this form, however.

The sensor is designed as a 2D array and can thus generate data which can two-dimensionally represent the phase shifts between excitation and emission.

The detector is usable for a broad frequency range, which can visualize the decay times of different fluorescent substances in separate work cycles, but also simultaneously.

For each fluorescence wavelength, in the case of an application for detection of features having two or more fluorescence wavelengths, suitable filters can be used in front of the photosensitive region of the chip, wherein the filters can be located outside the chip, for example as insert filters or in a filter wheel, or can form a separate unit in conjunction with the chip. In the manner of the Beyer filter on the image converter chips of commercially available digital cameras for generating color information, a color filter may be attached directly to the lock-in imager chip on each individual pixel or on a group of pixels to filter out specific fluorescence radiation. A sequence of red and green pixel filters having known pixel address enables, for example, the simultaneous capture of red or green fluorescent light. In the case of a Foveon chip as an image-sensitive sensor, the use of color filters is superfluous if the color-selective sensor levels can be used for the filtering of the fluorescent light.

The sensor is advantageously protected using a filter against light of the exciting frequency if the function of such a blocking filter cannot be assumed by the filter for the transmission of the fluorescent light, for example a suitable narrowband filter.

In other words, a device and a method are disclosed which are suitable for the verification of a luminescent security feature for the personalization, serialization, or authentication of an object or document. They are distinguished in that the luminescence lifetime of at least one luminescent feature substance which is contained in surface elements of the security feature is measured, wherein, firstly, the excitation light of suitable frequency is emitted from an intensity-modulated light source and induces a modulated luminescence in the at least one feature substance, which luminescence has a phase shift in relation to the exciting light; secondly, the phase shift of the luminescence of the at least first feature substance is detected by a photosensitive sensor, which captures at least a part of the at least first surface element, by the time control of the work cycles of the photosensitive sensor being dependent on the modulation of the excitation light, wherein the elements under firstly and secondly together form a detection unit, and, thirdly, the measured values generated by the sensor are converted by an analysis unit into a form which is useful for the verification of the security feature.

The construction of the detector is similar to an image-sensitive sensor and can represent a special embodiment of a CCD chip, wherein the image-recording technology is also conceivable using chips other than CCD (CMOS architecture, Foveon architecture, quantum point technology, etc.). Fundamentals on the principle are found, for example, in an overview article by A. Esposito et al. (see Opt Express 2005 Nov. 28; 13(24): 9812-21). A device constructed according to this principle for an FLIM application was published as US 2007/0018116 A1.

In addition to the identification parameters excitation/emission frequency of one or more fluorescent feature substances and the spatial distribution thereof on the sample surface, the nature of the chemical preparation is available as a variable for the fine tuning of the fluorescence decay times. The fluorescence decay time of a feature substance may be influenced by the selection of the chemical environment, for example by the pH value in a printing ink. An underlying principle is known as Frster resonance energy transfer (FRET). It is also possible to influence the phase shift perceptible by the sensor by a homogeneous mixture of pigments having different fluorescence decay times, which results in a mixed signal during the signal processing up to visually interpretable image display. On the other hand, a nonhomogeneous distribution of at least two fluorescent feature substances having different fluorescence lifetimes has the result that the phase shift values are differentiable in the image processing downstream of the measurement.

The requirement for an authentication of a security feature on the individual item level is thus easy to fulfill, in particular if the security feature is adapted to the technical possibilities of the detection device and/or if the verification of the object or document is especially provided for the verification using the detection device. The authentication method is carried out in the generally routine case using feature substances which display a luminescence or fluorescence linked to a Stokes emission (down-converter). It is also possible in principle to perform a lifetime measurement of the emission radiation of phosphorescent feature substances, feature substances having an anti-Stokes emission (up-converter) or those whose emission is based on quantum dots.

In principle, there is no restriction with respect to the chemical nature of the fluorescent feature substance. The feature substance can thus be organic or inorganic, it can be of metallic or ceramic nature or else a biomolecule. One essential advantage of the method is the possible portability of the entire arrangement of measuring device and life image display. While, for example, US 2007/0018116 A1 discloses a typical laboratory method, which is conceived for use in a laboratory infrastructure and presumes technically trained personnel for the analysis and interpretation of the results, the method proposed here is suitable for being carried out at any location and at any time. Only a minimum of instruction of the user is necessary, and so the user can also be a typical consumer.

To include a user circle down to the layperson level, a nearly intuitive operation of the detection device is implemented. Such a technical level is provided, for example, if the authentication can be carried out on the basis of a self-explanatory app. Therefore, a portable and comparably cost-effective device in a type of handheld embodiment (handheld device) for the data acquisition and also an easily available device such as a smartphone or tablet for the image display having an app which is well comprehensible to a layperson for the operation are proposed.

The operation is suitable for being partially or completely automated. The connection of the mobile image or video display unit, i.e., for example, the smartphone, can be performed wirelessly in a known manner, for example via Bluetooth or a device-integrated WLAN, or via a standard cable, such as a USB cable. The smartphone or tablet required for the operation not only offers the function of the visualization, but rather additionally includes options as are sometimes required in trademark protection. Such options are, for example, an ability to trace the user via the device identification (UDID) or the capture of geodata and point in time to capture the location and time of the verification. These data or specifications, which are arbitrary in principle, from various sources in principle, combined completely or partially as an encrypted or unencrypted report, supply increasingly significant items of information for monitoring of the distribution pathways in trademark piracy. Therefore, products may be authenticated at the point of sale (POS) or product warehouse or it is made possible, for example, for the age of a product to be determined at the time of purchase. The data which are collected using the method according to the invention additionally open up the path to usage for logistics and marketing. The smartphone or tablet used additionally enables the connection to a central server to store and analyze the verification result centrally. Furthermore, a possibly required software update is possible via a server connection without action on the part of the operator, which enhances the reliability of measurement and analysis, on the one hand, and frees the user from cumbersome operating tasks for system maintenance, on the other hand. Of course, it is also possible to shift these functions including the connectivity (Internet connection) from the smartphone into the detection device itself. Another operation variant of the application is to shift a part of the operation or the entire operation to a device coupled to the smartphone, for example a wristwatch, for example into an iWatch coupled to an iPhone. In principle, the image display can be performed via a display and the analysis can also be performed in the detector unit having the lock-in imager itself, more or less as a combination of smartphone or tablet and the detection unit in one housing. In contrast, it is advantageous for the application of the two-dimensional measurement or visualization of the decay time-related phase shift if the detection unit was integrated into a smartphone or into a smartphone having suitable camera attachment.

Several subjects which are provided by the present disclosure will be summarized briefly once again below:

(a) Device for verification of a luminescent security feature for the personalization, serialization, or authentication of an object or document,
wherein the luminescence lifetime of at least one luminescent feature substance which is contained in at least one surface element of the security feature is measured,
wherein firstly, the excitation light of suitable frequency is emitted by an intensity-modulated light source (4) and induces a modulated luminescence in the at least one feature substance, which luminescence has a phase shift in relation to the exciting light,
wherein secondly, the phase shift of the luminescence of the at least first feature substance is detected by a photosensitive sensor (6), which captures at least a part of the at least first surface element (3), by the time control of the work cycles of the photosensitive sensor being dependent on the modulation of the excitation light,
wherein the elements under firstly and secondly together form a detection unit (23), and
thirdly, the measured values generated by the sensor are converted by a display and analysis unit (7) into a form which is useful for the verification of the security feature.

(b) The device is a portable device.

(c) The display and analysis unit (7) is housed directly in the housing of the detection unit (23) or is a separate unit such as a smartphone or a tablet computer.

(d) The detection unit (23) is integrated in the display and analysis unit (7), which is a smartphone or a tablet computer, or is part of the display and analysis unit as a camera attachment.

(e) The measured values are visually displayed.

(f) The shaping of the security feature which is given by at least one surface element (3) having at least one feature substance is used for the verification.

(g) The measured values of the phase shift of the fluorescent light are displayed in real time.

(h) The analysis unit (7) can carry out all tasks or a part of the tasks which are used for the verification of the object or the document in an automated manner.

(i) The measured values are processed in such a way that the verification is performed in the form of a report which is directly output by the analysis unit or is relayed to a server.

(j) The report contains, in addition to the processed data from the measured values, arbitrary further specifications which originate from data from various sources which are accessible to the analysis unit. In this case, the report can be partially or completely made available to the person carrying out the verification using the device or can be entirely or partially encrypted.

(k) The luminescent feature substances have a Stokes or anti-Stokes emission.

(l) An at least second feature substance has a second value different from the first feature substance for a phase shift, which, in the case of a nonhomogeneous mixture of the at least two feature substances, can be differentiated by the device from the value for the phase shift.

(m) An at least second feature substance has a frequency of the luminescent light different from the first feature substance, which the device can differentiate from the frequency of the luminescent light.

(n) Object or document having at least one luminescent security feature for the personalization, serialization, or authentication, for which a verification using a device of the above type is provided.

(o) Method for verification of a luminescent security feature for the personalization, serialization, or authentication of an object or document, wherein the luminescence lifetime of at least one luminescent feature substance, which is contained in at least one surface element of the security feature, is measured, wherein firstly, the excitation light of suitable frequency is emitted by modulated light source (4) and induces a modulated luminescence in the at least one feature substance which has a phase shift in relation to the exciting light; secondly, the phase shift of the luminescence of the at least one first feature substance is detected by a photosensitive sensor (6), which captures at least a part of the at least first surface element, by the time control of the work cycles of the photosensitive sensor (6) being dependent on the modulation of the excitation light, and thirdly, the measured values generated by the sensor are converted by an analysis unit (7) into a form which is useful for the verification of the security feature.

The invention claimed is:

1. A verification method for verification of a security feature the method comprising:
    illuminating the security feature using excitation light, which is intensity-modulated at a modulation frequency;
    detecting luminescent light, which is emitted by the security feature, in a plurality of pixels synchronously with the modulation frequency;
    determining a dimension for a phase shift between the excitation light and the luminescent light at the modulation frequency in different pixels; and
    verifying the security feature based on a dimension for the phase shift in different pixels,
    wherein the dimension for the phase shift is visualized in different pixel in real time for verification of the security feature.

2. The method as claimed in claim 1, which comprises:
    determining a dimension for at least one of the following parameters in different pixels: excitation frequency, emission frequency, and luminescence intensity, and
    verifying the security feature both based on the dimension for the phase shift in different pixels and also based on the dimension for the said parameter in different pixels.

3. The method as claimed in claim 2, wherein both the dimension for the phase shift in different pixels and also the dimension for said parameter in different pixels are visualized for verification of the security feature.

4. The method as claimed in claim 3, wherein both the dimension for the phase shift in different pixels and also the dimension for said parameter in different pixels are visualized in real time for verification of the security feature.

5. A use of a lock-in imager for the verification of a security feature comprising a plurality of luminescent surface elements, wherein a luminescence lifetime is determinable for each of the surface elements upon illumination of the security feature using excitation light that is intensity-modulated at a modulation frequency, and wherein a luminescence lifetime varies between the surface elements, wherein the lock-in imager comprises:
  a plurality of pixels, to detect luminescent light, which is emitted by the security feature, synchronously with the modulation frequency and to determine a dimension for a phase shift between the excitation light and the luminescent light in different pixels, wherein the dimension for the phase shift in different pixels is visualized in real time.

6. A detection unit for the detection of a security feature the detection unit comprising:
  a light source for generating excitation light, wherein the light source is designed to modulate the intensity of the excitation light at a modulation frequency;
  a lock-in imager, which comprises a plurality of pixels, to detect luminescent light, which is emitted by the security feature, synchronously with the modulation frequency and to determine a dimension for a phase shift between the excitation light and the luminescent light in different pixels; and
  an interface, which is configured to transmit the dimension for the phase shift in different pixels to a display and analysis unit,
  wherein the interface is configured to transmit the dimension for the phase shift in different pixels to the display and analysis unit in real time.

7. The detection unit as claimed in claim 6,
  wherein the detection unit has a housing, in which the light source and the lock-in imager are arranged,
  wherein the housing has a window, which is designed to be arranged over the security feature, and
  wherein the detection unit has imaging optics to image and focus the security feature arranged below the window on the lock-in imager.

8. The detection unit as claimed in claim 7, wherein the imaging optics image and focus the security feature arranged below the window on the lock-in imager in a reduced scale.

9. The detection unit as claimed in claim 6, wherein the detection unit is portable.

10. The detection unit as claimed in claim 6,
  wherein the lock-in imager is designed, in addition to the dimension for the phase shift in different pixels, to also determine a dimension for at least one of the following parameters: excitation frequency, emission frequency, and luminesene intensity, and
  wherein the interface is configured, in addition to the dimension for the phase shift in different pixels, to also transfer the dimension for the said parameter in different pixels to the display and analysis unit.

11. The detection unit as claimed in claim 10, wherein the interface is configured to also transfer the dimension for said parameter in different pixels to the display and analysis unit in real time.

12. A verification device having a detection unit as claimed in claim 6 and having a display and analysis unit, which is formed separately from the detection unit, wherein at least one of:
  i) the display and analysis unit is configured to generate a graphic representation from the dimension for the phase shift in different pixels, and
  ii) the display and analysis unit is configured to execute an automated verification on the basis of the dimension for the phase shift and at least one of i) outputs the verification result and ii) relays the verification result to a server.

13. The verification device as claimed in claim 12, wherein the display and analysis unit is a smartphone or a tablet computer.

14. The verification device as claimed in claim 12, wherein the display and analysis unit is configured to generate a graphic representation from the dimension for the phase shift in real time.

15. The detection unit as claimed in claim 6, wherein
  the security feature comprises a plurality of luminescent surface elements, wherein a luminescence lifetime is determinable for each of the surface elements, and wherein the luminescence lifetime varies between the surface elements.

* * * * *